United States Patent
DeLong et al.

(10) Patent No.: US 6,932,410 B2
(45) Date of Patent: Aug. 23, 2005

(54) INSTRUMENT-PANEL MOUNTING SYSTEM

(75) Inventors: Aaron M. DeLong, Orion, MI (US); John F. Peck, Jr., Canton, MI (US); Sarkis M. Mikhjian, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/749,158

(22) Filed: Dec. 30, 2003

(65) Prior Publication Data

US 2005/0140161 A1    Jun. 30, 2005

(51) Int. Cl.$^7$ ............................................. B60K 37/00
(52) U.S. Cl. ........................................ 296/72; 296/70
(58) Field of Search .................... 296/70, 72; 280/752, 280/779; 180/90; 411/371.2, 547

(56) References Cited

U.S. PATENT DOCUMENTS

| | | | |
|---|---|---|---|
| 5,992,825 A | 11/1999 | Vollenweider, II | 254/93 |
| 5,992,925 A * | 11/1999 | Alberici | 296/203.02 |
| 6,481,786 B1 | 11/2002 | Kim | 296/203.02 |
| 6,517,139 B2 | 2/2003 | Sutou et al. | 296/70 |
| 6,523,878 B2 | 2/2003 | Scheidel | 296/70 |
| 6,634,693 B2 * | 10/2003 | Straesser, Jr. | 296/70 |
| 6,767,041 B2 * | 7/2004 | Shiono | 296/70 |
| 6,779,826 B2 * | 8/2004 | Nakajima | 296/70 |
| 2002/0084667 A1 | 7/2002 | Sutou et al. | 296/70 |
| 2002/0185882 A1 | 12/2002 | Galea | 296/70 |
| 2003/0071477 A1 | 4/2003 | Kakamu et al. | 296/70 |

* cited by examiner

Primary Examiner—Stephen Gordon
(74) Attorney, Agent, or Firm—Bliss McGlynn, P.C.; Bill Panagos

(57) ABSTRACT

An instrument-panel mounting system mounts an instrument panel to the body of an automotive vehicle. The mounting system includes an instrument panel having at least one base panel with at least one aperture defined through the base panel and adapted to be aligned with a corresponding aperture on the vehicle body. A threaded fastener is received in the aligned apertures defined through the base panel and vehicle body and adapted to generate a clamping force to mount the instrument panel to the vehicle body. A clamping sheet is disposed between the base panel and vehicle body. The clamping sheet includes an aperture defined through the clamping sheet and aligned with the aligned apertures defined through the base panel and vehicle body. The clamping sheet also includes a strut defined about the periphery of the aperture defined through the clamping sheet and extending in the general direction of the clamping force generated by the fastener. The strut acts to distribute the clamping force through the clamping sheet and vehicle body.

10 Claims, 2 Drawing Sheets

INSTRUMENT-PANEL MOUNTING SYSTEM

BACKGROUND OF THE INVENTION

1. Field of the Invention

The present invention relates, generally, to an instrument panel for an automotive vehicle and, more specifically, to a system for mounting the instrument panel to the body of the vehicle.

2. Description of the Related Art

An instrument panel, or dashboard, of a motor vehicle is generally mounted to the body of the vehicle using a plurality of brackets and corresponding attachment structures. More specifically, the instrument panel usually includes a cross beam extending along the longitudinal length of the instrument panel. Each of the brackets of the instrument panel is secured to the cross beam at one end of the bracket. The other end of the bracket includes the attachment structure, which is described in detail below. The instrument panel is typically mounted to a panel of the vehicle body known as the "body in white." The body in white includes a plenum, or cowl panel, extending completely across the vehicle and disposed in spaced, substantially parallel relation with the cross beam. Each bracket extends substantially perpendicular with respect to the cross beam to the plenum. The attachment structure of the other end of each bracket is attached to the plenum to mount the instrument panel to the vehicle body.

In particular, the attachment structure of the instrument panel typically includes a base panel, a steel or sheet-metal structure, and a fastener, such as a bolt or screw. A bolt, for instance, fastens the base panel to the plenum while sandwiching the steel structure between them. The base panel is, therefore, sandwiched between the head of the bolt and the steel structure. In this way, the bolt is adapted to generate a clamping force, or torque, to mount the instrument panel to the vehicle body.

The bolt can exert a magnitude of torque of approximately 120 lbs.+/−20 lbs. upon the base panel of the instrument panel at the plenum. However, the base panel is typically made of thermo-plastic olefin (TPO), which is a rubberized version of polypropylene. TPO is a relatively soft material that does not adequately take torque beyond a magnitude of 20 lbs.+/−5 lbs. More specifically, beyond this magnitude, a continual tightening and relaxing of the base panel can occur within a range of approximately 2 mm, for example. This "squishing" effect can cause the base panel to continually change its shape under the torque of the bolt sufficiently such that it is not adequately secured in its proper position between the bolt head and the steel structure and, thus, becomes loose. As a result, the instrument panel can buzz, squeak, and/or rattle with respect to the vehicle body. In this case, an instrument panel having a TPO base panel will not achieve a proper amount of torque at the plenum where the base panel is sandwiched between the steel structure and the bolt head.

To solve this problem, a brass washer or shoulder bolt is often used to better distribute the clamping force exerted by the bolt. Brass is used for this application because it is strong and, yet, malleable. As such, the torque extends through both the washer, for instance, and base panel. In this way, the base panel is not subjected to such high levels of concentrated clamping force. Thus, the "squishing" effect of the base panel is decreased. The bolt, however, still places a proper amount of torque on the steel structure to capture, but not disturb, the TPO base panel.

Although the instrument-panel attachment structure of the related art is adequate for its intended purpose, it has some disadvantages. In particular, use of brass washers in connection with shoulder bolt adds cost to the manufacture of the respective vehicle. This is especially true in view of the fact that there are typically four brackets used to mount any given instrument panel to the vehicle body, each of which requires a brass-washer-and-bolt combination.

Accordingly, there remains a need in the related art for a cost-effective mounting system that effectively distributes clamping force while securely mounting an instrument panel to a vehicle body. There is also a need in the related art to reduce the number of components employed in any mounting system thereby reducing parts.

SUMMARY OF THE INVENTION

The present invention overcomes the disadvantages in the related art in a system for mounting an instrument panel to the body of an automotive vehicle. The mounting system includes an instrument panel having at least one base panel with at least one aperture defined through the base panel and adapted to be aligned with a corresponding aperture on the vehicle body. A threaded fastener is received in the aligned apertures defined through the base panel and vehicle body and adapted to generate a clamping force to mount the instrument panel to the vehicle body. A clamping sheet is disposed between the base panel and vehicle body. The clamping sheet includes an aperture defined therethrough and aligned with the aligned apertures defined through the base panel and vehicle body. The clamping sheet also includes a strut defined about the periphery of the aperture defined through the clamping sheet and extending in the general direction of the clamping force generated by the fastener. The strut acts to distribute the clamping force through the clamping sheet and vehicle body.

One advantage of the instrument-panel mounting system of the present invention is that the instrument panel, especially one having a TPO base panel, can achieve a proper amount of torque at the plenum, even when a magnitude of torque of approximately 120 lbs.+/−20 lbs. is exerted upon the base panel of the instrument panel at the plenum.

Another advantage of the instrument-panel mounting system of the present invention is that it eliminates the need for a bushing, washer, or a shoulder bolt.

Another advantage of the instrument-panel mounting system of the present invention is that it can accept a sufficient amount of torque while keeping the base panel secured and undamaged.

Another advantage of the instrument-panel mounting system of the present invention is that the "squishing" effect between the base panel and the plenum is eliminated or minimized.

Another advantage of the instrument-panel mounting system of the present invention is that tightening and relaxing of the base panel is eliminated or minimized.

Another advantage of the instrument-panel mounting system of the present invention is that buzzing, squeaking, and/or rattling of the instrument panel with respect to the vehicle body is eliminated or minimized.

Another advantage of the instrument-panel mounting system of the present invention is that the clamping sheet is a relatively low-cost item that can be stamped from sheet metal.

Another advantage of the instrument-panel mounting system of the present invention is that it reduces cost and the overall complexity when compared with mounting systems known in the related art.

DETAILED DESCRIPTION OF THE INVENTION

Figure 1:
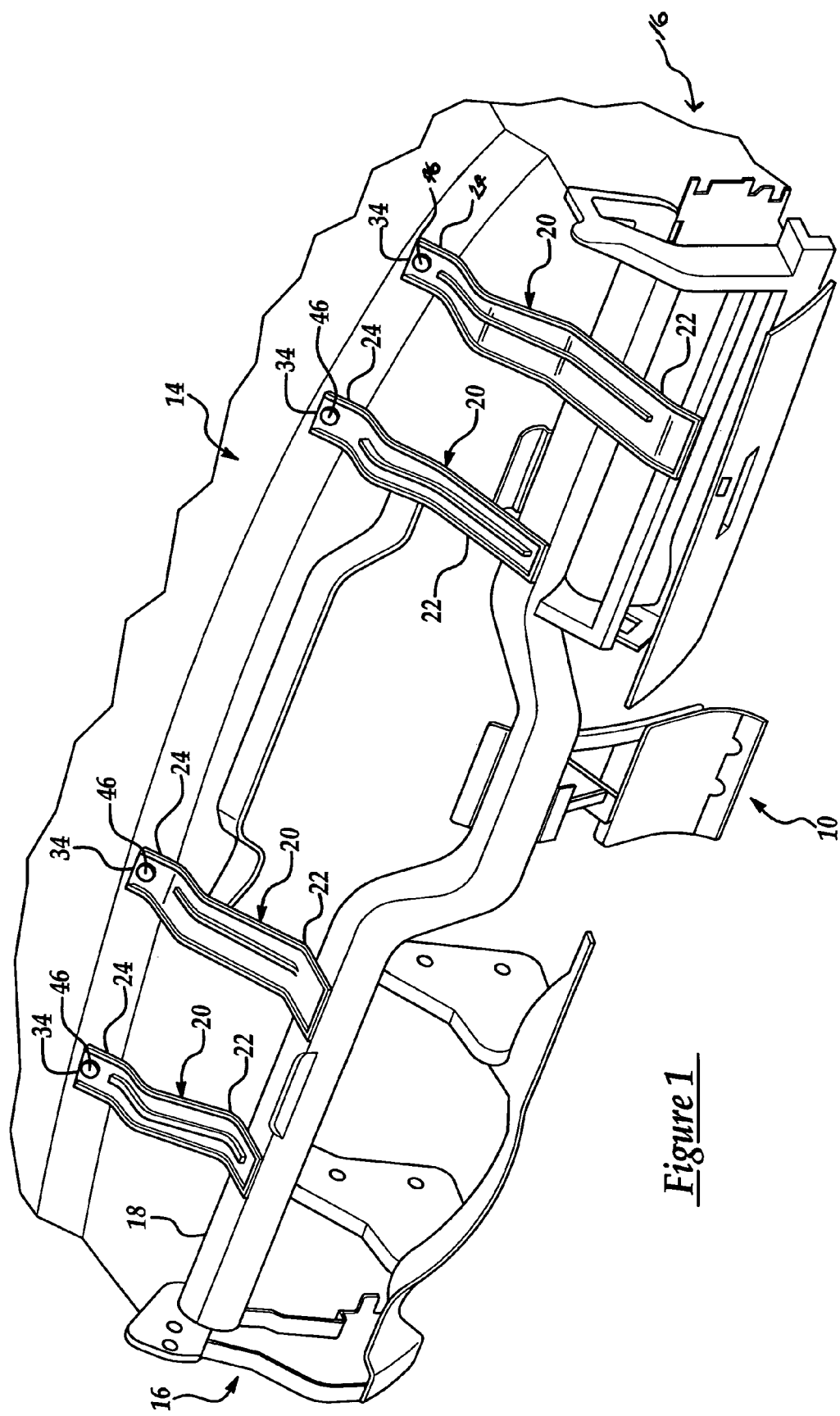
FIG. 1 is an environmental view of the instrument-panel mounting system of the present invention shown in structural relationship with a body of a motor vehicle.

The structural frame of an instrument panel of a motor vehicle is generally indicated at 10 in FIG. 1, where like numerals are used to designate like structure. The frame 10 is shown mounted crosswise to structure of a vehicle body, generally indicated at 14. The frame 10 has two ends, generally indicated at 16, designed to be mounted on respective opposite components (not shown) of the interior of the vehicle body 14. The frame 10 also includes a cross beam 18 that is hollow and substantially circular in cross-section and extends along the longitudinal length of the frame 10. The frame 10 further includes a plurality of mounting brackets, generally indicated at 20, that serve to connect the instrument panel 12 to the vehicle body 14.

More specifically, FIG. 1 shows four mounting brackets 20 spaced from one another and extending from the frame 10 to the vehicle body 14 in substantially parallel relationship with each other. Each mounting bracket 20 defines two ends 22, 24, respectively. End 22 is attached to the cross beam 18, and end 24 is adapted to be attached to the vehicle body 14. The vehicle body 14 includes a body panel, generally indicated at 26, and a body superstructure, or plenum, generally indicated at 28 in FIGS. 2 and 3 and described in detail below. End 24 of each mounting bracket 20 is adapted to be attached to the body panel 26.

Figure 2:
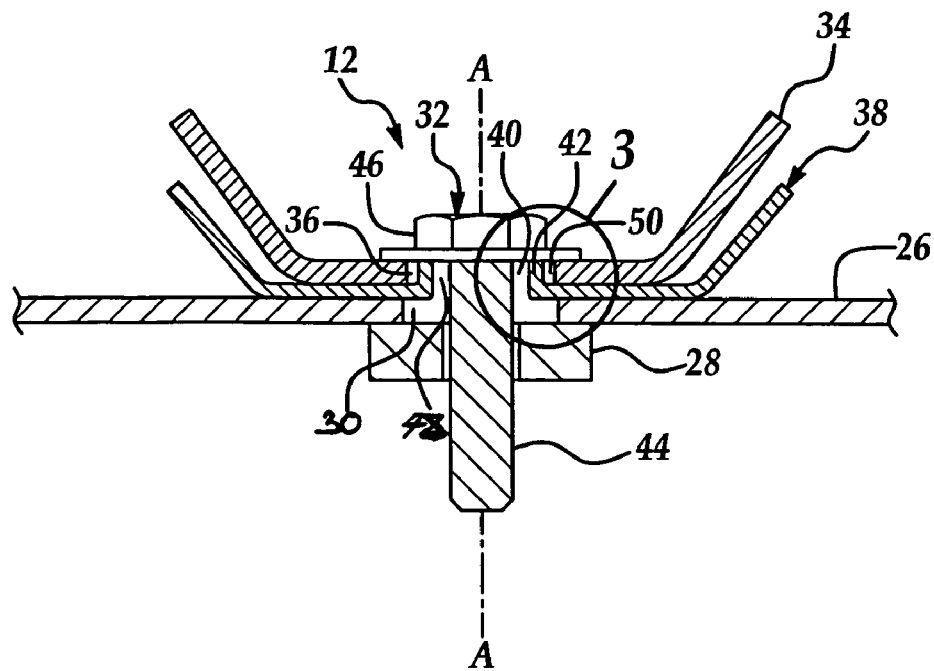
FIG. 2 is a cross-sectional side view of the instrument-panel mounting system of the present invention shown in structural relationship with a panel of a body of a motor vehicle, and a fastener.
Figure 3:
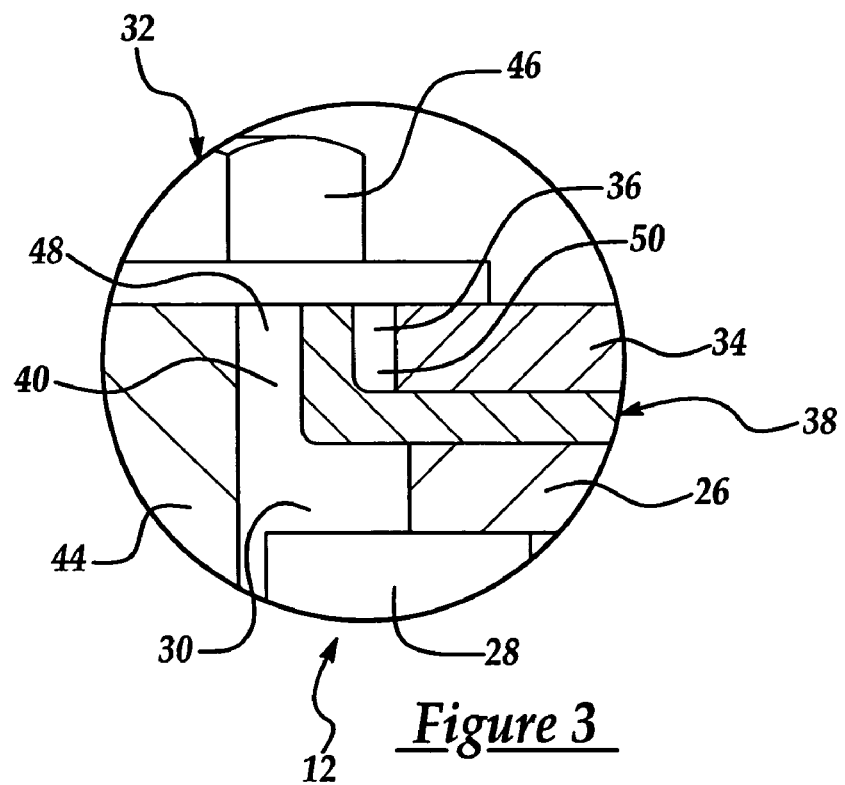
FIG. 3 is an enlarged view of the portion of the instrument-panel mounting system of the present invention shown encircled in FIG. 2.

An instrument-panel mounting system according to the present invention is generally indicated at 12 in FIGS. 2–3. The instrument-panel mounting system 12 includes the body panel 26 having an aperture 30 completely therethrough. As described in detail below, a threaded fastener, generally indicated at 32, is adapted to be operatively received in the aperture 30 to fasten the frame 10 to the body panel 26.

Those having ordinary skill in the art will appreciate that the frame 10 described above and shown in FIG. 1 is only an example of the type of structural relationship between an instrument panel and a vehicle body with which the mounting system 12 can be employed. It will be understood from the description that follows that the mounting system 12 can be employed with any suitable structural relationship between an instrument panel and a vehicle body, in general, and any suitable instrument panel and vehicle body, in particular.

The mounting system 12 generally includes at least one base panel 34 defined on end 24 of each mounting bracket 20. Each base panel 34 includes at least one aperture 36 defined therethrough and adapted to be aligned with the corresponding aperture 30 on the body panel 26. The threaded fastener 32 is received in the aligned apertures 36, 30 defined through the base panel 34 and vehicle body 14, respectively. The threaded fastener 32 generates a clamping force, or torque, to mount the frame 10 to the vehicle body 14 as will be discussed in greater detail below. A clamping sheet, generally indicated at 38, is disposed between the base panel 34 and vehicle body 14. The clamping sheet 38 includes an aperture 40 defined therethrough and aligned with the aligned apertures 36, 30 defined through the base panel 34 and vehicle body 14. The clamping sheet 38 also includes a strut 42 defined about the periphery of aperture 40 and extending in the general direction of the clamping force generated by the fastener 32. More specifically, the strut 42 extends axially with respect to the fastener 32. The strut 42 acts to distribute the clamping force through the clamping sheet 38 and vehicle body 14.

In a preferred embodiment of the attachment structure 12 and as shown in FIGS. 2 and 3, the fastener 32 includes a bolt 44 having a head 46 that clampingly engages the base panel 34 and the strut 42 to generate the clamping force. In particular, the fastener 32 includes a threaded shaft 44 disposed substantially perpendicular with the head 46 and that threadingly engages the superstructure 28 to generate the clamping force. The clamping force extends between the head 46 of the bolt 44 and the superstructure 28. In this way, the clamping force extends through the base panel 34 and clamping sheet 38 to mount the frame 10 to the vehicle body 14.

More specifically and as best shown in FIG. 3, the diameter of aperture 30 is larger than that of aperture 36, which is larger than that of aperture 40. As shown in FIG. 2, the aligned apertures 30, 36, 40 and the fastener 32 define an axis "A." The strut 42 extends substantially parallel with the axis "A" through the aperture 36 defined through the base panel 34 and into contact with the head 46 of the bolt 44. As such, the strut 42 is disposed substantially perpendicular with respect to the head 46 of the bolt 44 and parallel with respect to the threaded shaft 44. As best shown in FIG. 3, the strut 42 is formed integrally with the clamping sheet 38.

As best shown in FIG. 2, the amount of surface area of the head 46 of the bolt 44 in contacting relationship with the base panel 34 is substantially equal to the amount of surface area of the head 46 of the bolt 44 in contacting relationship with the clamping sheet 38 via the strut 42. In this way, the clamping force is distributed through the clamping sheet 38 and shared between the base panel 34 and clamping sheet 38.

As best shown in FIG. 3, the aperture 40 defined through the clamping sheet 38 defines a space 48 between the clamping sheet 38 and the fastener 32. The aperture 36 defined through the base panel 34 defines a space 50 between the base panel 34 and the strut 42. Preferably, the clamping sheet 38 is made of steel or metal.

Those having ordinary skill in the art will appreciate that apertures 30, 36, 40 can have any suitable size with respect to each other and with respect to the body panel 26, base panel 34, clamping sheet 38, and fastener 32 as well. Those having ordinary skill in the art will also appreciate that the strut 42 can have any suitable structural relationship with respect to the clamping sheet 38, the fastener 32, and the base panel 34. Those having ordinary skill in the art will further appreciate that the clamping sheet 38 can be made of any suitable material.

In operation, the threaded fastener 32 generates a clamping force, or torque, at the body superstructure, or plenum 28, to mount the frame 10 to the vehicle body 14. In so doing, the clamping force extends through the base panel 34 and clamping sheet 38. More specifically, the clamping force is distributed throughout the clamping sheet 38 and shared between the base panel 34 and clamping sheet 38. So, unlike the clamping sheet of the instrument-panel mounting system of the related art, the clamping sheet 38 of the mounting system 12 directly receives a substantial amount of the torque to take a substantial amount of torque off the base panel 34. An instrument panel, especially one having a TPO base panel, using the mounting system 12 can achieve a proper amount of torque at the plenum. In some cases, one-hundred percent torque can be achieved. This is the case even when a magnitude of torque of approximately 120 lbs.+/−20 lbs. is exerted upon the base panel 34 at the plenum. The base panel 34, however, still receives a sufficient amount of torque to be secured in its proper position while eliminating or minimizing tightening and relaxing of the base panel 34. In this way, the "squishing" effect between the base panel 34 and the plenum is eliminated or minimized. In particular, "squishing" can be limited to the range of 0 mm to 14 mm.

Furthermore, the mounting system 12 eliminates or minimizes buzzing, squeaking, and/or rattling of the instrument panel with respect to the vehicle body 14. The mounting system 12 also eliminates the need for a brass washer or a shoulder bolt and can accept a sufficient amount of torque while keeping the base panel 34 clamped and undamaged. The clamping sheet 38 with its integrally formed strut 42 can be stamped from sheet metal, and, thus, saves cost and effectively reduces the number of components employed to mount the instrument panel to the vehicle body 14.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An instrument-panel mounting system for mounting an instrument panel to the body of an automotive vehicle, said system comprising:

the instrument panel having at least one base panel with at least one aperture defined therethrough and adapted to be aligned with a corresponding aperture on the vehicle body;

a threaded fastener received in said apertures defined through said base panel and the vehicle body when aligned and adapted to generate a clamping force to mount said instrument panel to the vehicle body; and a clamping sheet disposed between said base panel and the vehicle body, said clamping sheet including an aperture defined therethrough and aligned with said apertures defined through said base panel and the vehicle body when aligned, said clamping sheet including a strut defined about the periphery of said aperture defined through said clamping sheet and extending in the general direction of the clamping force generated by said fastener, said strut acting to distribute said clamping force through said clamping sheet and the vehicle body.

2. An instrument-panel mounting system as set forth in claim 1, wherein said fastener includes a bolt having a head that clampingly engages said base panel and said strut to generate the clamping force, the clamping force extending through said base panel and said clamping sheet to mount said instrument panel to the vehicle body.

3. An instrument-panel mounting system as set forth in claim 2, wherein said strut extends axially through said aperture defined through said base panel and into contact with said head of said bolt.

4. An instrument-panel mounting system as set forth in claim 2, wherein the vehicle body includes a body panel and a body superstructure, the clamping force extending between said head of said bolt and said superstructure.

5. An instrument-panel mounting system as set forth in claim 4, wherein said fastener includes a threaded shaft that threadingly engages said superstructure to generate the clamping force extending between said head of said bolt and said superstructure.

6. An instrument-panel mounting system as set forth in claim 1, wherein said aperture defined through said clamping sheet defines a space between said clamping sheet and said fastener.

7. An instrument-panel mounting system as set forth in claim 1, wherein said aperture defined through said base panel defines a space between said base panel and said strut.

8. An instrument-panel mounting system as set forth in claim 2, wherein said strut extends substantially perpendicular with respect to said head of said bolt in the general direction of the clamping force generated by said fastener.

9. An instrument-panel mounting system as set forth in claim 1, wherein said strut integrally extends from said clamping sheet.

10. An instrument-panel mounting system as set forth in claim 1, wherein said clamping sheet is made of either one of steel and metal.

* * * * *

UNITED STATES PATENT AND TRADEMARK OFFICE
CERTIFICATE OF CORRECTION

| | | |
|---|---|---|
| PATENT NO. | : 6,932,410 B2 | Page 1 of 1 |
| APPLICATION NO. | : 10/749158 | |
| DATED | : August 23, 2005 | |
| INVENTOR(S) | : DeLong et al. | |

It is certified that error appears in the above-identified patent and that said Letters Patent is hereby corrected as shown below:

Column 5, line 20 delete "14mm" and insert therefore --1/4 mm--.

Signed and Sealed this

Twelfth Day of September, 2006

JON W. DUDAS
*Director of the United States Patent and Trademark Office*